US012710978B2

(12) United States Patent
Feng et al.

(10) Patent No.: US 12,710,978 B2
(45) Date of Patent: Aug. 18, 2026

(54) DISTRIBUTED PROCESSING OF TRANSACTIONS IN A NETWORK USING TIMESTAMPS

(71) Applicant: Huawei Cloud Computing Technologies Co., Ltd., Guizhou (CN)

(72) Inventors: Hao Feng, Bellevue, WA (US); Ivan Avramov, Sammamish, WA (US)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 660 days.

(21) Appl. No.: 18/070,845

(22) Filed: Nov. 29, 2022

(65) Prior Publication Data

US 2023/0106118 A1 Apr. 6, 2023

Related U.S. Application Data

(63) Continuation of application No. PCT/US2020/041017, filed on Jul. 7, 2020.

(60) Provisional application No. 63/032,589, filed on May 30, 2020.

(51) Int. Cl.

| | |
|---|---|
| ***G06F 9/46*** | (2006.01) |
| ***G06F 9/52*** | (2006.01) |
| ***G06F 16/23*** | (2019.01) |

(52) U.S. Cl.
CPC ................ *G06F 9/466* (2013.01); *G06F 9/52* (2013.01); *G06F 16/2322* (2019.01)

(58) Field of Classification Search
CPC ......... G06F 9/466; G06F 16/2322; G06F 9/52
See application file for complete search history.

(56) References Cited

U.S. PATENT DOCUMENTS

| | | | | |
|---|---|---|---|---|
| 9,955,444 | B1 * | 4/2018 | Blum | G06F 16/951 |
| 2006/0069939 | A1 * | 3/2006 | Fredriksson | H04L 69/28<br>713/400 |
| 2011/0196900 | A1 * | 8/2011 | Drobychev | G06F 16/122<br>707/812 |

(Continued)

OTHER PUBLICATIONS

Corbett et al. Spanner: TrueTime and external consistency. [online] Google., Retrieved From the Internet <https://cloud.google.com/spanner/docs/true-time-external-consistency> (Year: 2012).*

(Continued)

*Primary Examiner* — Adam M Queler

(57) ABSTRACT

The disclosure relates to a technique for processing a sequence of transactions to maintain consistency in a distributed system. A node receives a first transaction from a client for a data record associated with a first timestamp. The node identifies a second transaction for the data record that conflicts with the first transaction, where the identified second transaction has a second timestamp that is a most recent transaction stored in the node. A determination is then received by the node of a transmission status of the second transaction, and a result of the first transaction is transmitted to fulfill the first transaction received from a client based on the determined transmission status, fulfillment of the first transaction occurring after a full transmission time period of the first transaction is greater than or equal to a minimum transaction latency (MTL) of the distributed system.

24 Claims, 9 Drawing Sheets

(56) References Cited

U.S. PATENT DOCUMENTS

| | | | | |
|---|---|---|---|---|
| 2013/0086649 | A1* | 4/2013 | Battistello | H04L 9/083 726/4 |
| 2013/0110883 | A1 | 5/2013 | Junqueira et al. | |
| 2013/0332926 | A1* | 12/2013 | Jakoljevic | G06F 9/45533 718/1 |
| 2015/0229312 | A1* | 8/2015 | Sekiya | H03L 7/0814 327/158 |
| 2018/0329739 | A1 | 11/2018 | Cooper et al. | |
| 2019/0158371 | A1* | 5/2019 | Dillon | H04L 47/196 |
| 2020/0134043 | A1* | 4/2020 | Demoor | G06F 16/122 |

OTHER PUBLICATIONS

International Preliminary Report on Patentability dated Dec. 15, 2022, International Application No. PCT/US2020/041017.

International Search Report and Written Opinion dated Feb. 4, 2021, International Application No. PCT/US2020/041017.

* cited by examiner

DISTRIBUTED PROCESSING OF TRANSACTIONS IN A NETWORK USING TIMESTAMPS

CLAIM FOR PRIORITY

This application is a continuation of PCT Patent Application No. PCT/US2020/041017, entitled "DISTRIBUTED PROCESSING OF TRANSACTIONS IN A NETWORK USING TIMESTAMPS", filed Jul. 7, 2020, which claims the benefit of priority to U.S. Provisional Application No. 63/032,589, filed May 30, 2020, the entire contents of which are hereby incorporated by reference.

FIELD

The disclosure generally relates to distributed processing of transactions in a network.

BACKGROUND

In a traditional database system, database software is installed on a single machine. This allows the system to manage concurrent users while ensuring that they observe a consistent state of the database and ensuring concurrent and potentially conflicting modifications preserve that consistency. However, traditional approaches limit the performance capacity of the database system to the capacity of the single machine which creates a single point of failure in the architecture. With the rise of global businesses and services, the requirement to increase this capacity has driven the emergence of distributed database systems, where the data is carefully split (partitioned) among hundreds and thousands of machines which may be physically spread across geographic regions, such as continents.

In systems with upwards of billions of users distributed across geographical regions, the data consistency requirement is of paramount importance. Many solutions have been developed to resolve this data consistency requirement. However, achieving a good balance among these competing objectives is a difficult problem. In currently available systems, this is accomplished by trading off consistency for better latency, or by making database transactions applicable for a small sub-class of transactions.

SUMMARY

According to one aspect of the present disclosure, there is provided a computer-implemented method for processing a sequence of transactions to maintain consistency and latency in a distributed system, comprising receiving, by a node, a first transaction for a data record associated with a first timestamp; identifying, by the node, a second transaction for the data record that conflicts with the first transaction, wherein the identified second transaction has a second timestamp that is a most recent transaction stored in the node; and receiving a determination, by the node, of a transmission status of the second transaction; and transmitting, by the node, a result of the first transaction to fulfill the first transaction received from a client based on the determination of the transmission status, fulfillment of the first transaction occurring after a full transmission time period of the first transaction is greater than or equal to a minimum transaction latency (MTL) of the distributed system.

Optionally, in the preceding aspect, wherein the first and second timestamps include an uncertainty window, and the uncertainty window is based on a standard clock synchronization error at a timestamp service issuing the first or second timestamp.

Optionally, in any of the preceding aspects, wherein a maximum of the standard clock synchronization error at all timestamp services in the distributed system is less than a minimum transaction latency (MTL).

Optionally, in any of the preceding aspects, the first timestamp includes a first sequence number and a first uncertainty window, and the second timestamp includes a second sequence number and a second uncertainty window.

Optionally, in any of the preceding aspects, wherein the first and second timestamps are issued by different timestamp service instances, and when the sequence numbers are tied, the tie is broken by a timestamp service instance ID.

Optionally, in any of the preceding aspects, the method further comprising sequentially ordering the first transaction and the second transaction according to the first sequence number and the second sequence number, respectively, wherein the first and second timestamps are issued by a first timestamp service.

Optionally, in any of the preceding aspects, wherein when the first transaction is a read operation and the second transaction is a write intent operation, the transmission status of the second transaction is determined to be committed, and the result transmitted to the client is the data record for write intent operation; and when the first transaction is a write operation and the second transaction is a write intent operation, the transmission status of the second transaction is determined to be committed, and the result transmitted to the client is a success message.

Optionally, in any of the preceding aspects, wherein when the first transaction is a read operation and the second transaction is a write intent operation, the transmission status of the second transaction is determined to be aborted, and the result transmitted to the client is the data record committed before the write intent operation; and when the first transaction is a write operation and the second transaction is a write intent operation, the transmission status of the second transaction is determined to be aborted, and the result transmitted to the client is a success message.

Optionally, in any of the preceding aspects, wherein the first transaction is a read operation and the second transaction is a write intent operation, the transmission status of the second transaction is determined to be in-progress, and the method further comprising aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

Optionally, in any of the preceding aspects, wherein when the second transaction is aborted, marking the second transaction as aborted and issuing an asynchronous transmission cleanup, and the result transmitted to the client is the data record committed before the write intent operation; and when the first transaction is aborted, the result transmitted is a failure on the read operation.

Optionally, in any of the preceding aspects, wherein when the first and the second transactions are a same transaction, the write intent is returned in response to the read operation.

Optionally, in any of the preceding aspects, wherein the first transaction is a write operation and the second transaction is a write intent operation, the transmission status of the second transaction is determined to be in-progress, and the method further comprising aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

Optionally, in any of the preceding aspects, wherein when the second transaction is aborted, marking the second transaction as aborted and issuing an asynchronous transmission cleanup, and the result transmitted to the client is a success message; and when the first transaction is aborted, the result transmitted is a failure message.

According to another aspect of the present disclosure, there is a node for processing a sequence of transactions to maintain consistency and latency in a distributed system, comprising a non-transitory memory storage comprising instructions; and one or more processors in communication with the memory, wherein the one or more processors execute the instructions to receive a first transaction for a data record associated with a first timestamp; identify a second transaction for the data record that conflicts with the first transaction, wherein the identified second transaction has a second timestamp that is a most recent transaction stored in the node; and receive a determination of a transmission status of the second transaction and transmitting a result of the first transaction to fulfill the first transaction received from a client based on the determination of the transmission status, fulfillment of the first transaction occurring after a full transmission time period of the first transaction is greater than or equal to a minimum transaction latency (MTL) of the distributed system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
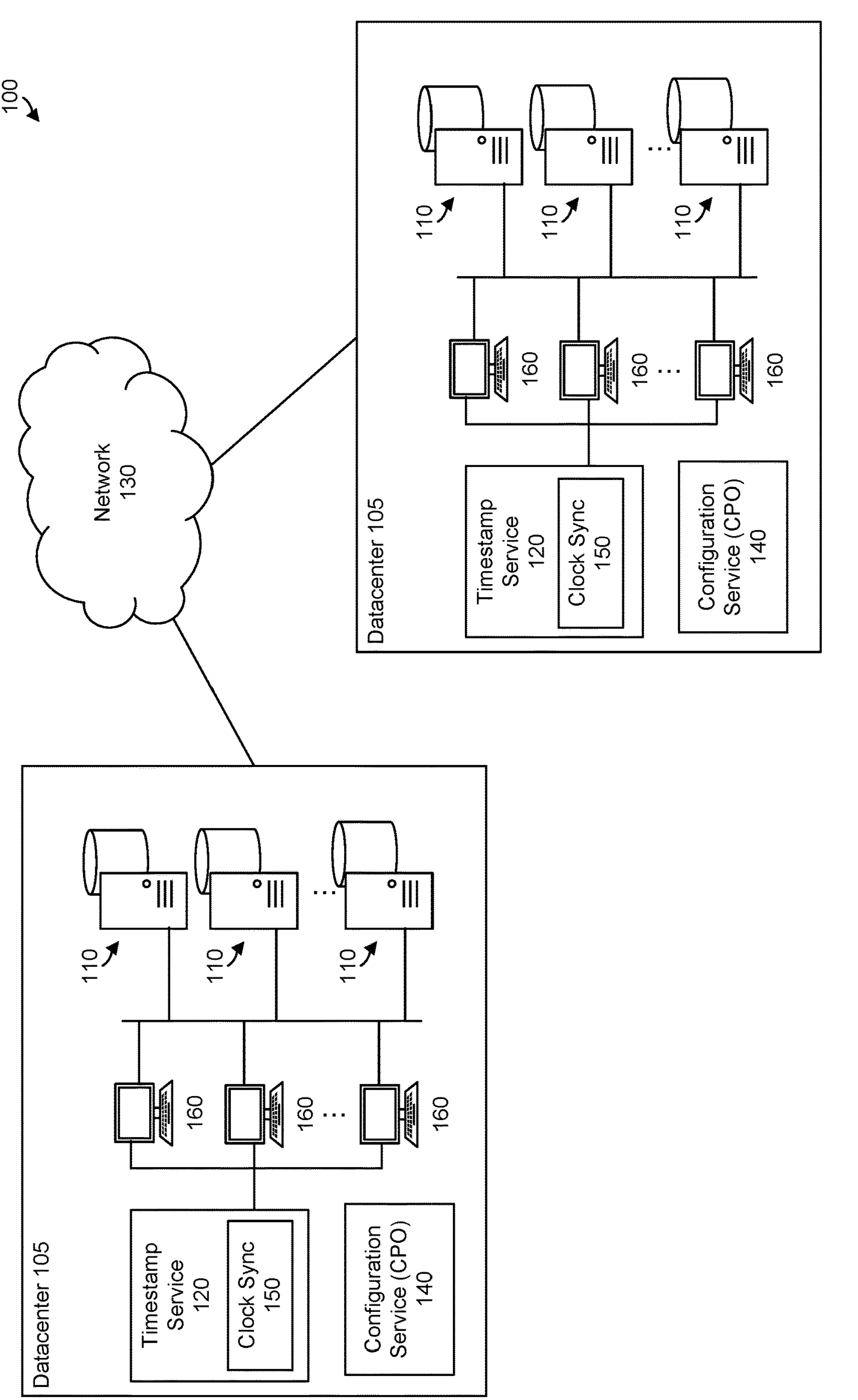
FIG. 1 illustrates an example system in which embodiments of the disclosure may be implemented.

The present disclosure will now be described with reference to the figures, which in general relate to technology for establishing a trusted relationship in a distributed system.

The present disclosure more specifically provides a level of consistency for the transactions (also referred to as a sequential level of consistency) by ordering of operations using the techniques disclosed. Timing of events and transactions in a distributed transactional system has been a fundamental issue for system consistency and concurrency control. Conventionally, there have been different approaches to address these issues, such as TimeVector, global timestamp, TrueTime (e.g., Google Spanner), HybridLogicTime, etc. However, conventional approaches have their limitations. For example, a global timestamp (i.e., a scalar value) benefits from being deterministic, but has scalability and latency issues. TrueTime (defined by an time uncertainty window, having a start time and an end time, between which the RealTime is contained with certainty), has the benefit of scalability and exposing the uncertainty to the system to handle with different approaches for different scenario. However, latency is significantly impacted.

A timestamp service (also referred to herein as "TSO") is used in both single datacenter and geographically remote or cross-regional datacenters. The timestamp service's function is to generate TimeStamps which are used to determine the relative strict order of any two operations, even if their transactions originated from different geographical regions, specified with timestamps from different timestamp services. Potential conflicts are detected based on the strict order of the timestamps of operations. Serializable snapshot isolation level (i.e., the degree to which one transaction is isolated from resource or data modifications caused by other concurrent transactions) is supported by disallowing conflicting read/write operations from different transactions on the same data. For example, "write-after-write" and "read-after-write" conflicts may be avoided to achieve serializable isolation.

The present disclosure also provides an "external causal consistency" in addition to sequential consistency. As noted above, sequential consistency specifies that the order of all events/transactions (within the distributed system) are fully agreed by all internal participants of a distributed system. However, sequential consistency lacks support for external causal consistency. External causal consistency, on the other hand, can correctly maintain the order of any two events/transactions with a causal relationship triggered by clients outside of the distributed system, while the distributed system is not aware and does not need to contain an explicit record of this causal relationship.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example embodiment of a distributed datacenter for implementing transactions. The system 100 may include datacenters 105 that may communicate via network 130. In one embodiment, the system 100 supports multi-version concurrency control (MVCC). Each of the datacenters 105 may include a node (e.g., server and/or data storage) 110, clients 160, a timestamp service 120 and a configuration service 140. Clients 160 may communicate within a datacenter 105 via wired connections or wireless connections, such as a network, or with another datacenter 105 via network 130. Although only two datacenters 105 are depicted in the example embodiment, it is appreciated that any number of datacenters may exist in system 100. Moreover, each of the datacenters may have any number of different components (e.g., clients, nodes, etc.) and are not limited to the depicted embodiment. In one embodiment, each datacenter 105 includes a configuration service or cluster manager (not shown) that manages data partition placement and load balance across serving nodes 110. Clients 160 may also acquire data partitions from the configuration service and local cache for use during operation.

Although not illustrated, a server 110 may contain a processor, memory and other components typically present in general purpose computers. The memory can store information accessible by the processor, including instructions that can be executed by the processor. Memory can also include data that can be retrieved, manipulated or stored by the processor. The memory may be a type of non-transitory computer readable medium capable of storing information accessible by the processor, such as a hard-drive, memory card, ROM, RAM, DVD, CD-ROM, write-capable, and read-only memories. The processor can be a well-known processor or other lesser-known types of processors. Alternatively, the processor can be a dedicated controller such as an ASIC.

The instructions can be a set of instructions executed directly, such as machine code, or indirectly, such as scripts, by the processor. In this regard, the terms "instructions," "steps" and "programs" can be used interchangeably herein. The instructions can be stored in object code format for direct processing by the processor or other types of computer language including scripts or collections of independent source code modules that are interpreted on demand or compiled in advance. Functions, methods and routines of the instructions are explained in more detail below.

The data can be retrieved, stored or modified by the processor in accordance with the instructions. For instance, although the system and method is not limited by a particular data structure, the data can be stored in computer registers, in a relational database as a table having a plurality of different fields and records, or XML documents. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data. For example, the data can include time data (or a timestamp) that may be encoded based on the instructions in a time format used to describe instants of time such as Coordinated Universal Time, Unix epoch and unambiguous International Atomic Time epoch. In one embodiment, the data includes a timestamp that is generated by timestamp service 120, which is described in detail further below.

Each of the servers 110 within a datacenter 105 is capable of directly and indirectly communicating with other in the datacenter 105. For example, the servers 110 can include a web server that may be capable of communicating with clients 160 via a network the network to transmit information to a client application. Servers 110 may also include a number of computers, e.g., a load balanced server farm, that exchange information with different nodes in the datacenter 105 for the purpose of receiving, processing and transmitting data to clients 160. In this instance, the clients 160 will typically still be at different nodes of the datacenter 105 than the servers 110.

Each client 160 may be configured, similarly to the nodes 110, with a processor, memory, instructions and data. Each client 160 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by the processor, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, network computers lacking local storage capability, set top boxes for televisions, and other networked devices.

The client 160 may include an application interface module. The application interface module (not shown) may be used to access a service made available by a server, such as servers 110. For example, the application interface module may include sub-routines, data structures, object classes and other type of software components used to allow servers 110 and clients 160 to communicate with each other. In one aspect, the application interface module may be a software module operable in conjunction with several types of operating systems known in the arts. For example, the client 160 may be connected to a Structured Query Language (SQL) database server that may operate in conjunction with the application interface module for saving and retrieving information data. Memory coupled to a client 160 may store data accessed by the application module. The data can also be stored on a removable medium such as a disk, tape, SD Card or CD-ROM, which can be connected to client 160. In a datacenter environment, the clients 160 may be server devices such as application server computers, virtual computing host computers, or file server computers. Moreover, clients 160 may be individually configured to provide computing, storage, and/or other suitable computing services.

The timestamp service 120 is, for example, a server computing a process or set of processes that provides timestamps during a transaction(s). In one embodiment, the timestamp service 120 may include a consensus protocol, such as Paxos (not shown), as well as a standard clock synchronization mechanism, such as clock sync 150. As defined herein, a timestamp is a value representing time used in a distributed system. More specifically, the timestamp is a window of time with some bounded uncertainty from UniversalTime (i.e., a TimeValue which is universally accepted to be the correct time, such as generated by an atomic clock). The value may be a scalar value or a more complex data structure. The value may also be machine time or real time issued from a time authority service (e.g., timestamp oracle (TSO)—a sub-system in a distributed system that is responsible to issue a timestamp to the components in the distributed system upon request), such as a TimeVector, or a TrueTime (e.g., an uncertainty window of TStart and Tend, in which the real time may be found), global timestamp, HybridLogicTime, etc. Accordingly, the timestamp may be a combination of TrueTime (uncertainty window) and a SequenceNumber, which is strictly increasing when issued from a same timestamp service 120. In one embodiment, timestamps issued from a same timestamp service include a Sequence Number.

In one embodiment, the timestamp service 120 is communicatively coupled to a global clock, such as an atomic clock that provides a universal time. The timestamp service 120 may also communicate the identity of the timestamp service that issues the timestamp. For example, the information conveyed may include a timestamp start time (Tstart), a timestamp end time (Tend) and a timestamp ID (TSOid), which is globally unique, where the "Tend" is a strictly-increasing number (allowing sequencing of local events/transactions) and the window [Tstart, Tend] represents the confidence of the timestamp service 120 that generated the timestamp is within the Universal Time window.

In one embodiment, when timestamp services 120 from different datacenters 105 issue timestamps, the timestamps may be generated in such a way that they overlap in their uncertainty windows. The timestamps may be strictly ordered by any observer (i.e. any participant in the transaction such as client 160, node 110, timestamp service 120, etc.) so that there is a universal agreement that these timestamps are in a particular order. In one embodiment, in order to maintain externally causal consistency, the transmission of the result of completing a transaction T1 to the client 160 may be delayed so that the client is not capable of creating a causal successor transaction T2 within the time uncertainty window of T1. Thus, if a causal relationship exists between two transactions (T1, T2), then T2 is a causal successor of T1 such that T2's timestamp is strictly greater than T1's timestamp. The physical network latency is usually sufficiently large to be greater than the maximum TrueTime uncertainty window size of any timestamp service such that no additional artificial delay is required.

In one embodiment, multiple instances of the timestamp service 120 may be created, such that each timestamp service 120 is configured to synchronize its local clock using a standard clock synchronization mechanism, such as clock sync 150. When synchronizing, an upper bound error of the clock synchronization from clock sync 150 may be obtained and registered with the configuration service 140 as a timestamp service provided within the system 100.

In one embodiment, the standard clock synchronization mechanism may be the linux-standard network time protocol (NTP) service, a modern algorithm, a dedicated atomic clock, GPS-enabled hardware for datacenter usage or any other mechanism which can synchronize clocks in a distributed system while guaranteeing some upper bound on the synchronization error.

The configuration service 140 is responsible for configuring IP addresses, etc. within the system 100, and maintains full knowledge of all participating timestamps service 120 instances, as well as their clock error bounds. The configuration service 140 is also responsible for creating datasets (collections of data records) in the system 100 and optionally associating one or more allowed timestamp service instances with data collections. The configuration service 140 may also provide the dataset collection information including allowed timestamp service instances and the maximum clock error bound across all timestamp service instances, referred to herein as minimum transaction latency (MTL), to all clients 204 of the dataset collection.

The network 130, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

In one embodiment, the datacenters 105 utilize remote direct memory access (RDMA) communication, making a synchronous DC-local timestamp service a viable option. This allows the local transactions to execute sequentially, without the risk of serialization violations due to time uncertainty. This may also be accomplished across different datacenters 105, where a client 160 from timestamp service 120 in a first datacenter 105 can issue writes into a second datacenter 105 served by timestamp 120. In this case, reads and writes originating from the timestamp service 120 in the first datacenter 105 may be resolved without uncertainty checks since the timestamps from timestamp service 120 are guaranteed to be ordered in a strictly increasing fashion. When a data contention occurs among participants originating from timestamp services 120 in different datacenters 105, the outcome of contention may still be performed using direct ordering of the timestamps. If there was no external causal relationship between the competing operations, then it is immaterial to the client 160 which operation is recorded to have occurred first, as long as there is a global agreement on this order. On the other hand, in cases where an external causal relationship exists, the correct causal relationship is maintained by the mechanism described below. In this case, directly ordering the timestamps will preserve the causal order of operations.

Figure 2:
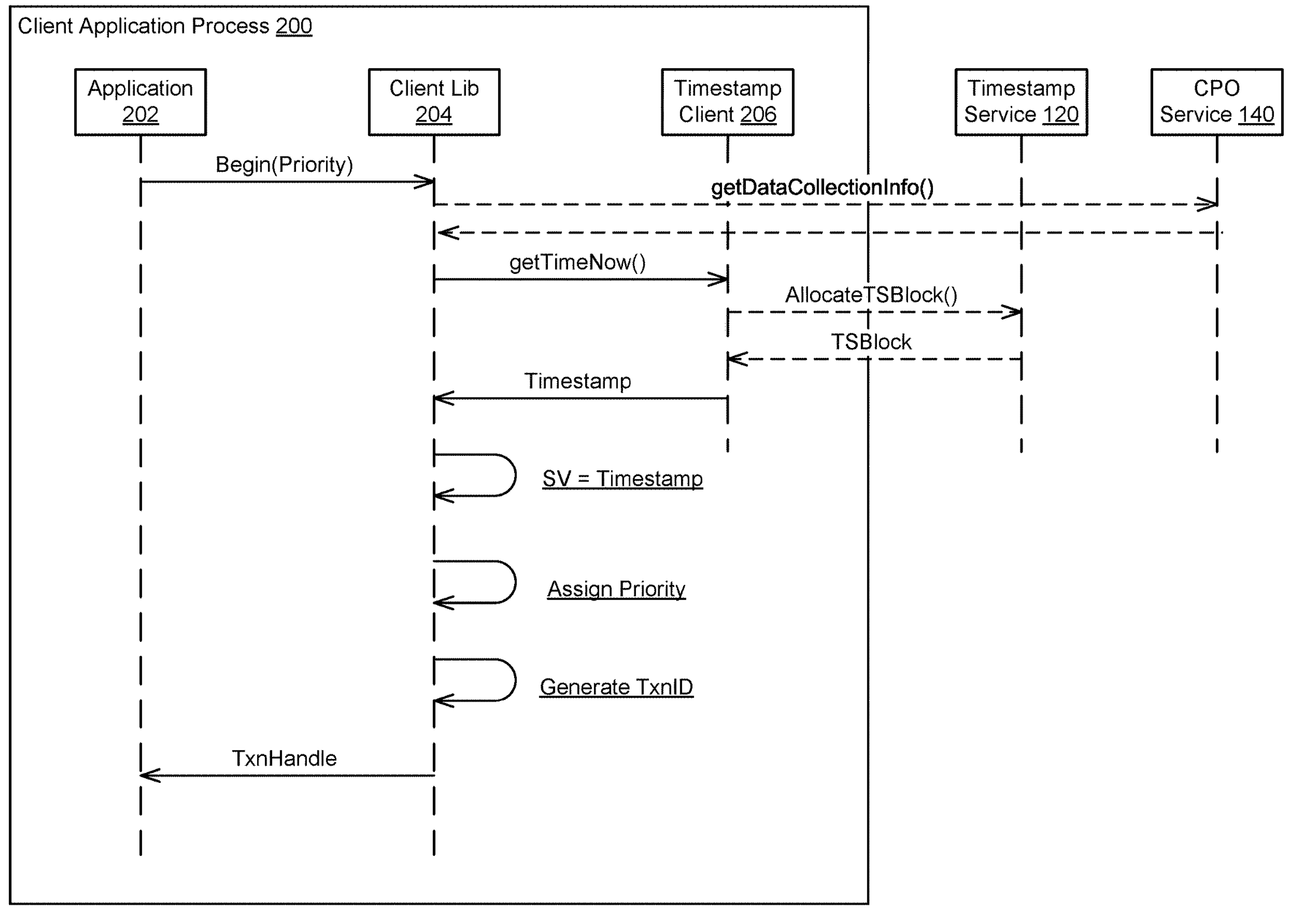
FIG. 2 illustrates an example of initiating a transaction in accordance with an embodiment of the disclosure.

FIG. 2 illustrates an example of initiating a transaction in accordance with an embodiment of the disclosure. The transaction is initiated by client 160 via a client application process 200. The client 160 includes an application 202, a client library 204 and a timestamp client 206 that initiates a timestamp request from the timestamp service 120 in which to receive a timestamp.

The timestamp provides an order of an event marked with the timestamp, through a comparison of the timestamp values of different events. For timestamps issued by the same timestamp service 120, the comparison of different timestamps for different events uses the timestamp's SequenceNumber. In one embodiment, the SequenceNumber is based on the TrueTime. As explained below, comparing SequenceNumbers is more efficient than comparing the TrueTime of events, which may have overlapped uncertainty windows that produce unknown results. On the other hand, using SequenceNumbers within a datacenter (e.g., RDMA) reduces latency, and is significantly faster than using TrueTime (e.g., Sequence numbers provide a latency in microseconds whereas TrueTime provides a latency in the milliseconds). In one embodiment, when timestamps are issued by the same timestamp service 120 (e.g., a timestamp service in a single datacenter), the SequenceNumber is the end time (Tend) of the uncertainty window, as described below.

SequenceNumbers based on TrueTime may be implemented according to the following example embodiments. In a first embodiment, the SequenceNumber is defined as an "augmented" RealTime when issuing the timestamp from the timestamp service 120. In this case, the SequenceNumber is typically defined as the center value of the TrueTime uncertainty window. The RealTime is augmented by the timestamp service 120 to guarantee a strictly increasing requirement of the SequenceNumber. Applying this technique, any two SequenceNumbers may be compared since the later issued SequenceNumber is always greater than the earlier issued SequenceNumber. This may be accomplished, for example, by not jumping backwards when the RealTime is adjusted back. For example, a time smearing algorithm (similar to adjusting leap seconds) may be used to perform this task. In another example, the timestamp service 120 master instance may persist a future time/SequenceNumber (periodically in the background asynchronously into, for example, a Paxos cluster) and only issue the future time/SequenceNumber.

In a second embodiment, the end (Tend) or start (Tstart) time of the uncertainty window is selected as the SequenceNumber. In one instance, the smear algorithm is used during time or uncertainty windows size adjustment to make sure the value is strictly increasing.

For the timestamp service 120 to provide an accurate TrueTime (e.g., with uncertainty windows size less than 1 ms), the timestamp service 120 is communicatively coupled to a real time provider, e.g. an atomic clock, GPS, etc. In one embodiment, for high availability (HA), the timestamp service 120 has multiple instances with one master, which may be backed up by consensus protocols or maintaining configuration information, such is done by Paxos or ZooKeeper. For example, the timestamp service 120 may be comprised of multiple instances on one or more machines. If there are N slaves and 1 master, each of the N slave instances will synchronize with a dedicated single master to ensure they can produce timestamps. Clients can connect to any of the N slaves and request a timestamp. This allows the system to scale up the number of timestamp services 120 to handle more timestamp requests than a single processor can fulfill by additional of extra slave devices. In one embodiment, to avoid issuing a lower value timestamp across an instance, the timestamp service master periodically preallocates the upper limit of timestamp/SequenceNumber and persists it in Paxos. For example, timestamps are effectively sequence numbers which need to be strictly increasing in order. That is, if a sequence S is obtained at time 'P,' then there is a guarantee that any request which comes at time greater than 'P' will receive a sequence strictly greater than S. Stated differently, in order to provide the required consistency guarantees, if transaction T2 is a (external) causal successor of transaction T1, then timestamp T2 should be strictly greater than timestamp T1.

In another embodiment, when a standby instance is chosen to be a new master, the new master will issue the timestamp with a value set to be max (e.g., the currently persisted timestamp). A standby instance is a timestamp service master that is running but not involved in issuing requests or being consulted by another component.t. This "standby" is being updated by the master so that the standby is up-to-date. If the actual Master suffers a failure, then the standby instance allows the system to designate a new master faster than creating a new one.

In another embodiment, transactions may be distributed from different datacenters 105 in geographically different locations. As an example; a transaction may be issued from a first datacenter 105 to a second datacenter 105, as shown in FIG. 1. The first and second datacenters 105 each have a respective timestamp service 120. Clients 160 and participants 110 in geographically remote datacenters receive timestamps from respective timestamp services 120. For instance, clients 160 in a first datacenter 105 receive a timestamp from a first timestamp service 120, and clients 160 in a second datacenter 105, geographically remote from the first data center 105, receive a different timestamp from a second, different timestamp service 120. In this manner, each client 160 uses a timestamp received from its respective timestamp service 120, both within their own datacenter and in remotely geographic datacenters. The properties of the timestamps combined with the disclosure below guarantee that external causal consistency is still maintained.

With reference to the example embodiment of FIG. 2, upon the application 202 initiating a "begin( )" call, the client 204 (or client library) obtains up-to-date information about the data collection from the configuration service 140. This is information is requested via a "getDataCollectionInfo( )" call, and may be used in order to determine where nodes 110 are located in the system 100, what timestamp services 120 are allowed to be used in the data sets, the MTL for the dataset and for caching the data collection information in its local memory in order to amortize calls to the configuration service 140 for future transactions.

Subsequently, the client 204 requests a timestamp from the timestamp client 206 via a "getTimeNow( )" call from the client library API (of client 204). This request for a timestamp initiates an "AllocateTSBlock( )" call from the timestamp client 206 to the timestamp service 120, which returns a "TSBlock" (timestamp block) that includes the timestamp to be returned to the client 204 and application 202. As noted above, timestamps are tuples (Tstart, Tend, TSOid), which define an uncertainty window. That is, the timestamp service 120 produces timestamps that cover a potential error of time between the timestamp service 120 and UniversalTime. The generated timestamp will be used to stamp the entire transaction. That is, the commit time for all writes in the transaction will be recorded to occur at the timestamp, and a snapshot version (SV) read will be attempted at this timestamp. In one embodiment, the SV is the same as the timestamp.

In addition to the timestamp and SV, a priority may be assigned to the transaction. For example, a priority class (e.g., LOW/MED/HIGH) or a particular priority within the class may be assigned to the transaction. In one embodiment, the priority classes map to particular priorities (e.g., Low=10, Med=20, High=30). When a transaction is started, a class is typically assigned. In some instances, when a transaction is aborted due to conflicts, the transaction inherits the higher priority. That is, the message communicating that a transaction has been aborted by the system contains a new priority which may be used by the client 160 when retrying the transaction. In one further embodiment, the priority is used on the server side to deterministically select a transaction when a conflict arises.

During the transaction initiation, the client library 204 also generates a transaction ID (TxnID), such as an (IP address, time, random number). The TxnID may be used to distinguish transactions. For example, the client can combine these pieces of information to achieve a reasonable ID for a transaction—an ID that is not likely to conflict with an ID generated by another client or client instance.

Once the timestamp/SV, priority and TxnID have been generated, the client library 204 returns a transaction handle (TxnHandle) back to the application 202, such that operations may commence. Operations are executed in the context of the transaction using the transaction handle returned from the client library 204. The operations are generally either constant (e.g., read-only) or mutating (e.g., writes). However, it is appreciated that the operations are not limited to reads/writes (e.g., key value KV) reads/writes) and can be extended to allow any advanced single-node operations such as atomic ops (e.g., CAS) or even stored procedures. Further operations, including commit/abort are issued using the returned transaction handle, and the client library 204 may track the minimum transaction records (MTR), transaction record holder (TRH), and each write node (also referred to herein as a "participant").

Figure 3:
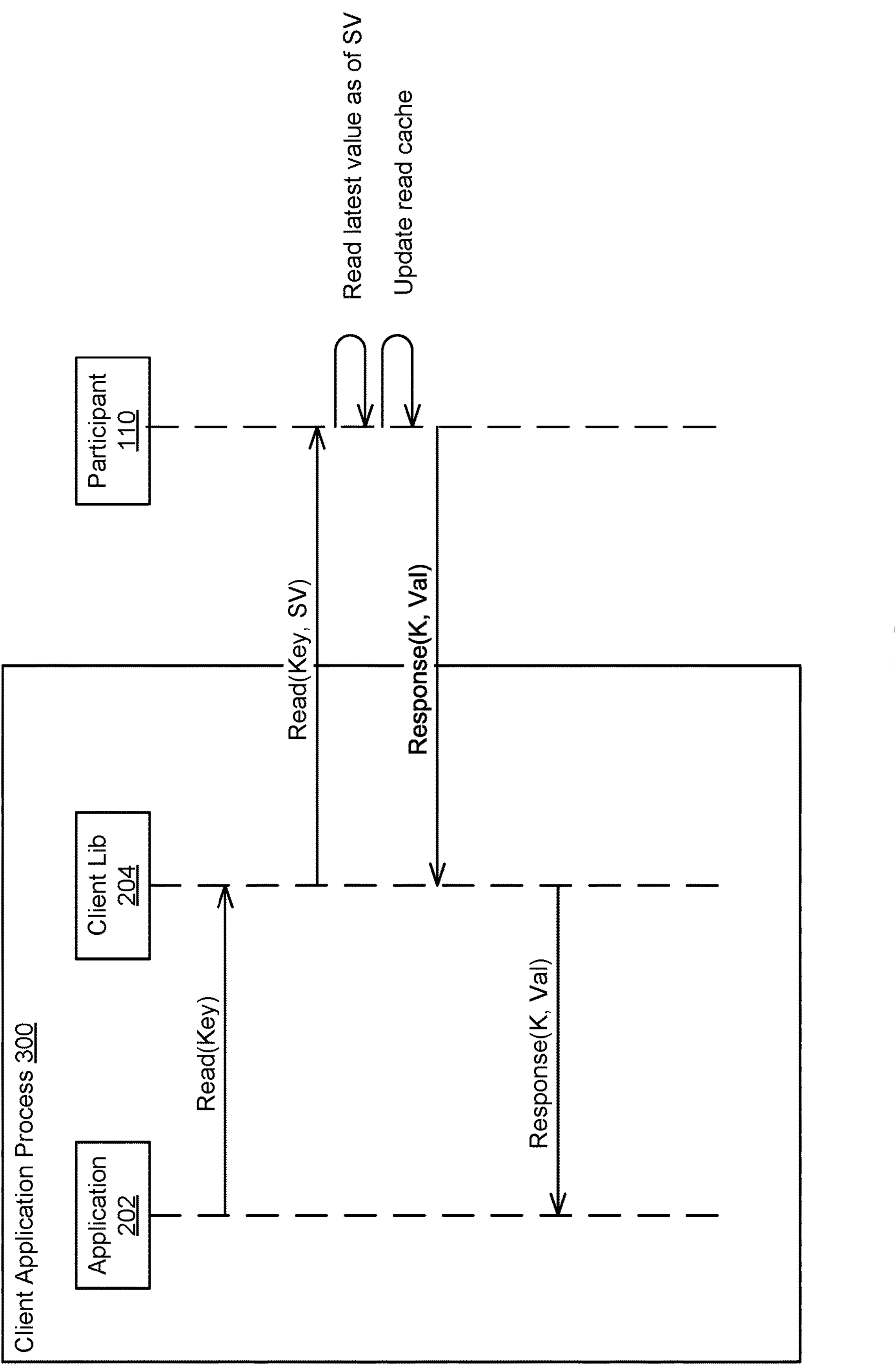
FIG. 3 illustrates an example read operation of a transaction in accordance with the disclosed embodiments.

FIG. 3 illustrates an example read operation of a transaction in accordance with the disclosed embodiments. The read operation is initiated by application 202, via a client application process 300, in which the application 202 issues a read operation to read the current value of the snapshot version (SV) stored in a participant 110.

During execution, each operation specifies a minimum transaction record (MTR), not shown. An MTR is a small tuple of metadata which may be specified in operations issued by the client 160. The MTR conveys the TxnID, timestamp, and priority, which may be used to perform snapshot reads, associate writes with transactions and resolve conflicts. During a read operation, the client 160 determines where to send the request, based on a current partition map (not shown) of a table in which transactions are executed against one or more datasets. The request is then sent to the owner of the data (i.e., the participant 110), who records the data access in its read cache and responds to client 160 with a success/failure message. The client library 204, annotates the read operation with an MTR, including the snapshot version (SV) for read purposes (such as an MVCC snapshot read). This SV is the timestamp acquired during initiation of the process (FIG. 2).

The request is received at the participant 110, where the data being requested is stored in memory. In one embodiment, multiple versions of the data are stored in memory and associated with a timestamp. The participant 110 then reads the latest value of the snapshot version (SV) using, for example, a standard MVCC read (i.e. the returned value is the latest value such that result.ts<=request.MTR.Timestamp), and the cache is updated to reflect the read (as described below). A response (i.e., Response(K,Val)) is then returned to the application 202 via client 204. In this case, the 'K' is a unique key that is associated with the returned value.

In order to prevent various anomalies during a read, and to achieve serializable snapshot isolation (i.e., transactions being ordered such that they will not be observed in a different order by different users), a read cache is maintained at each participant 110. In one embodiment, the read cache is a sliding window (maintaining the most recent read operations). The read cache recalls the most recent (latest) observed snapshot version (SV) for each key of a particular record in the system 100. In one embodiment, the SV stored in the read cache cannot be modified.

In one embodiment, for a sliding window, entries are removed from the read cache using a least recently used (LRU) technique. The read cache maintains a minimum snapshot version timestamp watermark. This watermark provides the oldest entry in the cache. Any write operation occurring before the timestamp (for any key) is aborted since there may have been a read for it.

When a read for a key is received at the participant 110 for a transaction with timestamp TS-A, the read cache is updated to reflect the most recent timestamp at which this key was ever observed. That is, if a read was previously done with transaction timestamp TS-B, then we set the time of last read of this key to be max (TS-A, TS-B). In one embodiment, the read cache is implemented as an interval tree.

In one embodiment, the read cache may also be accessed during a write operation to determine if a write for a particular key should be committed/aborted. Access during a write operation prevents the system 100 from breaking a promise to the requested read. For example, if a version of data is read at a snapshot version time, and a newer version of the data (e.g., write data with timestamp<=last SV Time the 'key' was read) attempts to insert the new data into the snapshot time, the attempt will be aborted. This aborting of the write operation preserves the earlier snapshot version of the data from modifications to the observed data history. Write operations are explained in more detail below.

In one other embodiment, the read cache is also used to detect a potential conflict situation during a read when reads from multiple timestamp services 120 exist (e.g., when a read over read exists). Potential read conflicts are discussed below.

In one embodiment, a conflict may occur. One type of conflict that may occur in the system is a read over write intent (WI) conflict. A read over WI (R→W) occurs when the latest snapshot version in the database, before a read timestamp, is a WI from a different transaction. Write intents are records in the system similar to any other record, and identify that the there is a pending intent to perform a write operation (as the name suggests). The WIs correspond to a version of the data for a "key," and track uncommitted writes. That is, a record which has the "uncommitted" flag set to 'ON' is a WI. When the post-commit (i.e., final) phase of a mutating transaction is completed, the flag is cleared (set to false, 'OFF') making the record a committed value. A WI also includes an MTR and a reference to a central coordinator (referred to herein as a Transaction Record Holder (TRH)) that is responsible for maintaining the transmission state for the transaction that created the WI in the participant 110. Thus, a WI can be used to determine the MTR (e.g., transaction ID, timestamp, priority), as well as the TRH of the transaction which placed ft. In each WI, in addition to the record content, additional transaction information may be stored that includes the TRH for the transaction.

Any transaction which performs a write operation may use the TRH for the transaction. In this case, the TRH is a write participant involved in the transaction that maintains a transaction record for each transaction for which it is the coordinator. In one embodiment, central transaction knowledge is not required across different transactions. Accordingly, the transaction records in the system are uniformly distributed across the entire cluster. In one other embodiment, the client 160 determines who the TRH will be for a given transaction, and sends a message to the TRH to let it know that it is responsible for the coordination tasks. The TRH can be chosen by time order, e.g. the first write operation involved participant, or key order, e.g. the one with lowest key to modify, or other approaches. In one further embodiment, the client 160 waits for a first write and piggy-backs a TRH-assignment message onto the first write operation. Read-only transactions do not create a transaction record as it is not needed.

When a WI is from a same transaction as a read operation, the WI is returned as the read value. When a WI is from a different transaction, a read value cannot be returned since the WI status may be unknown (e.g., the value was changed, the value is in the process of being changed, the write has been aborted, etc.). In either case, the system is not yet aware of the modification. Thus, if the value is returned to the client before the WI (the version before the WI), the client requesting the data will receive the wrong version since the commit of the W is equivalent to inserting a new record version into the current snapshot. To resolve this conflict, a PUSH operation is performed, as discussed below with reference to FIG. 5.

Figure 4:
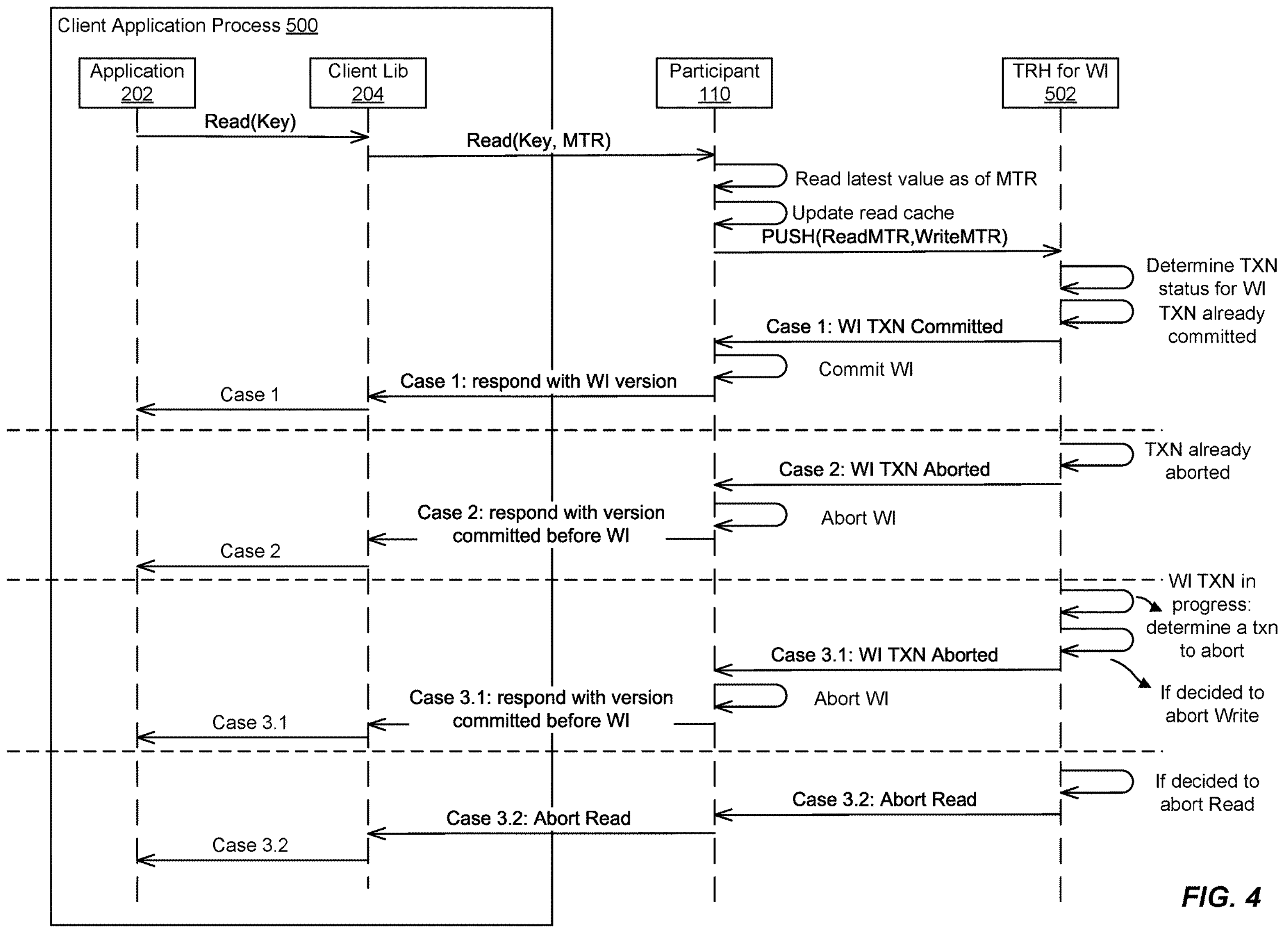
FIG. 4 illustrates an example PUSH operation during a read operation.

FIG. 4 illustrates an example PUSH operation during a read operation. To resolve the conflict of a read transaction encountering a WI (R→W), a PUSH operation is performed. A transaction starts when a client 160 requests a timestamp from the timestamp service 120. Each of the operations (read/write) of the transaction will be marked with the timestamp generated by the timestamp service 120. In one embodiment, any conflict detection and resolution will also use the timestamp generated by the timestamp service 120. In another embodiment, committed records will also be marked with the timestamp as a new version.

In the client application process 500, an application 202 and client 204 (including a client library) perform a read operation (read(key, MTR)), where the client 160 adds the MTR to the read operation. When the read request reaches the participant 110, the key/value as of time MTR.timestamp is read from a partition on the participant 110. The transaction timestamp, if it is a highest (most recent) value reading the key, will be recorded into memory (or memory updated) of the participant 110. In one embodiment, the memory is cache memory with a bookkeeping structure referred to herein as the "read cache." The read cache is utilized to ensure that if a different, concurrent transaction (having an uncertainty window) with an older timestamp arrives at the participant 110 with a write operation into the key/value, it will be blocked to thereby prevent a read-write conflict. When a read operation with a newer timestamp encounters a WI with an older timestamp, a process called "PUSH" is called to determine if the read operation can continue, as well as which version of the data to read.

The PUSH operation (PUSH(ChallengerMTR, IncumbentMTR) will first determine the status of transaction through its TRH 502 of which the current(incumbent) WI belongs. If the status is already committed or aborted, the WI (async) finalization has not been completed and can either update the WI to a new version (if the transaction is committed) or remove the WI (if the transaction is aborted). In general terms, if the current transaction is pending, then one of the two transactions will be aborted immediately to resolve the conflict. In one embodiment, determining which transaction to abort includes a comparison of at least one of a transaction priority, cost, etc. In one further embodiment, compensation logic may be used to increase any future success probability of an aborted transaction. For example, adding a dynamically-determined delay based on statistical (or machine-learning) analysis of traffic patterns to allow existing transactions to complete before making an abort determination. This optimization technique introduces some small delay in one transaction in order to provide a path of success to both transactions without requiring either one to abort.

In one embodiment, when a PUSH operation is performed, there may be no record stored at the TRH 502 (e.g., due to a network message delay). In this case, the system assumes that the transaction has been aborted, and a status entry is set to be equal to "Aborted."

In another embodiment, when write operations encounter a WI for a different transaction (a potential write conflict), a similar "PUSH" process may be used to resolve the conflict. Initial creation of a WI and a TRH change are synchronously persisted. Upon a transaction commit or abort, the change of the WI is asynchronously persisted. The persisted data may be durable (recoverable) and highly available in order to ensure correctness and robustness of the system. Examples of WI may be found below with reference to the various figures.

Example PUSH Operations

The depicted embodiment shows four cases of a PUSH operation for a read conflict. In case 1, the participant 110 can determine the status of the transaction (TXN). In this scenario, the transaction has already been committed (i.e., the transaction has already been transmitted). The participant 110 may commit the existing WI and transmit a response, including the WI version, to the client 204 and application 202.

In case 2, when the participant 110 calls a PUSH operation, the status of the WI is determined to be aborted. The participant 110 aborts the WI, and the WI is removed from the data cache. The participant 110 then transmits a response to the client 204 and application 202 as if the WI never existed (i.e., the version committed before WI).

In the example of cases 3.1 and 3.2, a transaction is occurring and still being modified (in progress). Thus, there is no reliable way in which to read the key/value for the transaction. In this instance, either the transaction performing the read operation or the write operation should be aborted. In one embodiment the transaction with the lower priority may be aborted. That is, one of the read/write operations may proceed and the other may be aborted in order to resolve the conflict. In case 3.1, the write operation is aborted and the participant 110 responds to the client 204 and application 202 with the version committed before the WI. In case 3.2, the read operation is aborted and a response is returned accordingly. In either case, the transaction status is recorded in the TRH 502.

Figure 5:
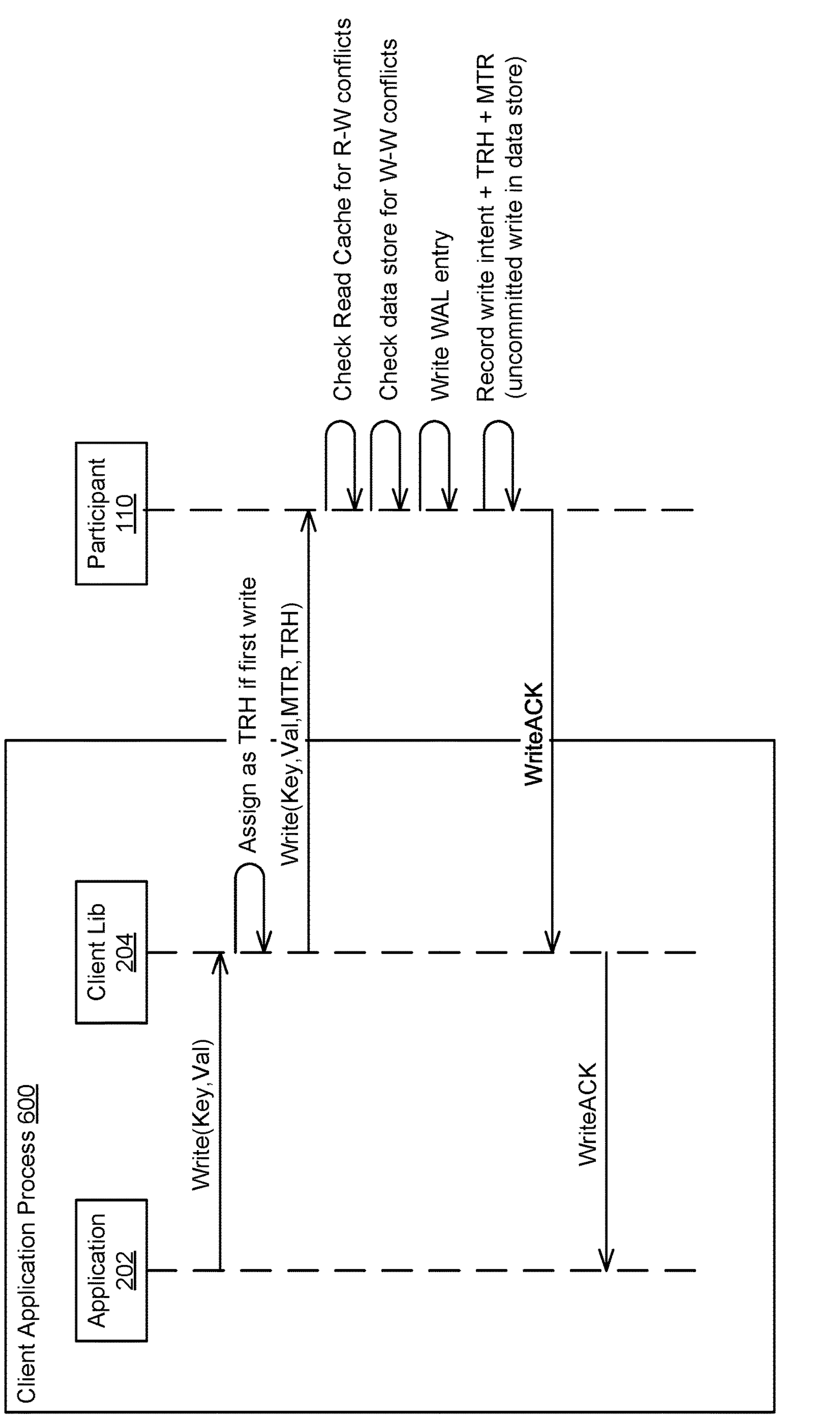
FIG. 5 illustrates an example write operation of a transaction in accordance with the disclosed embodiments.

FIG. 5 illustrates an example write operation of a transaction in accordance with the disclosed embodiments. As discussed above, write operations are messages that want to modify data. The messages are sent directly to the participant 110 that owns the data. As shown, the application 202 calls a write operation (Write(Key,Val)) to the client 204 (including the client library), which assigns a TRH in addition to the MTR (Write(Key,Val,MTR,TRH)). During a first write operation, a TRH is assigned in a manner similar to a read operation (as described above). In one embodiment, each participant 110 maintains an index of MTR→WI to cleanup WIs when the TRH finalizes a transaction (i.e., after the application commits/aborts). In one further embodiment, an LRU list exists for the index so that the participant 110 can discover potentially abandoned or long-running WIs and communicate with the TRH to finalize them.

When the participant 110 receives the write operation, the participant 110 checks to ensure that the write operation does not conflict with its read cache (W→R conflict). That is, the participant 110 checks whether the key about to be written was read such that the timestamp associated with the write operation is less than or equal to the snapshot version of the read operation (write.timestamp<=read.SV). If satisfied, the transaction issuing the write is immediately aborted. The participant 110 also checks whether the key to be written conflicts with any ongoing writes stored in the participant 100 (W→W conflict). Since the participant 110 maintains multiple versions (SVs), the participant 110 also checks whether the latest version stored in the participant 110 for the key is a WI. If a WI is stored, there is a write conflict (discussed below with reference to FIG. 7). After a write ahead logging (WAL), the WI entry (WI+MTR+TRH) is stored in the participant 110. The participant 110 then sends a WriteACK back to the client 204 and application 202 to complete client application process 600.

Figure 6:
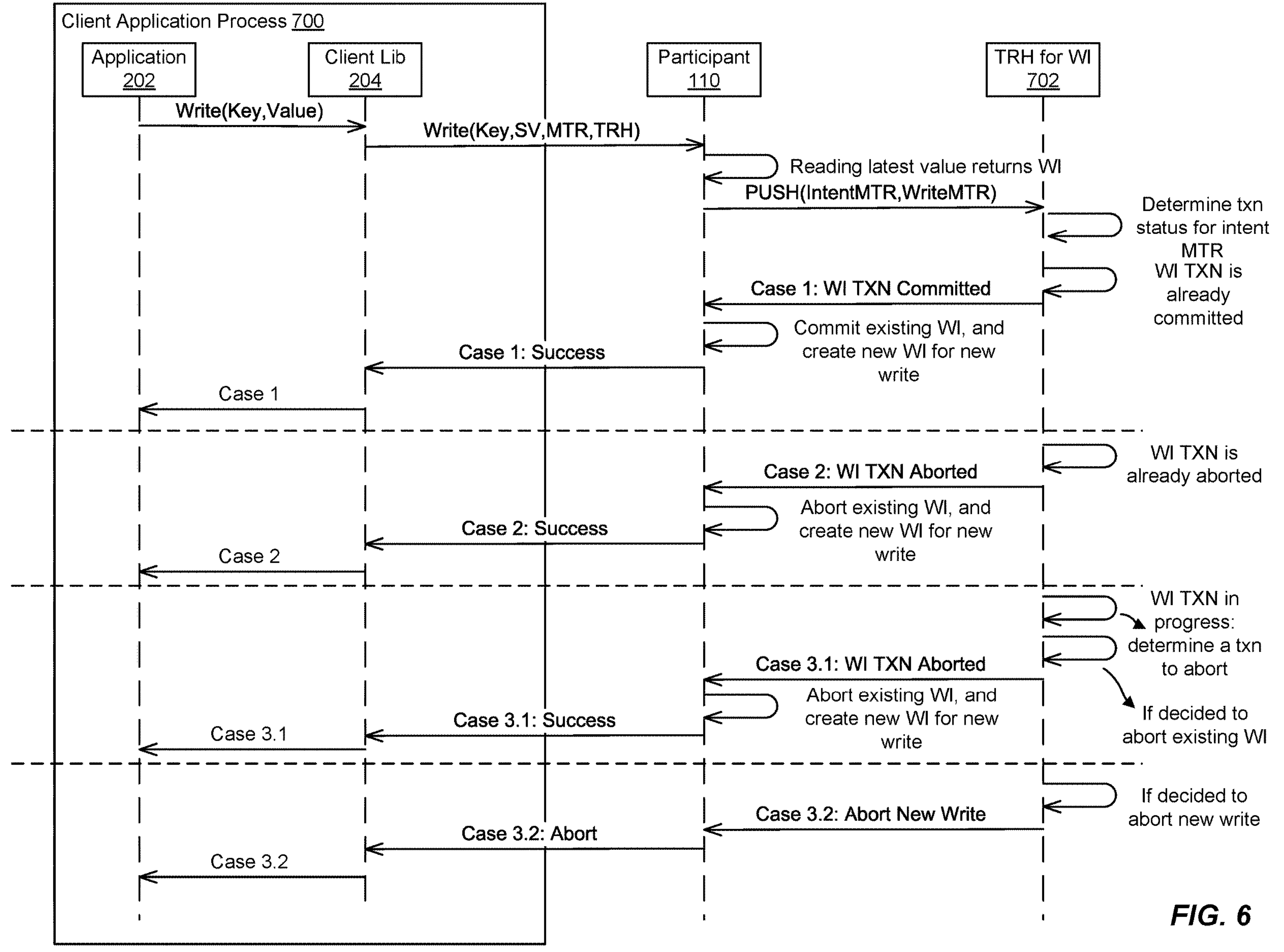
FIG. 6 illustrates an example PUSH operation during a write operation.

FIG. 6 illustrates an example PUSH operation during a write operation. In general, when the incoming write for a given key discovers that the read cache contains an entry for this key such that the write timestamp is less than or equal to the timestamp entry (write.TS<=entry.TS), a read conflict (W→R conflict) has been detected. In this case, the write is rejected and a message is sent to the client to abort the write operation and a refresh timestamp is sent back to the client. To determine whether a write conflict exists, the record history for the particular key that is stored will be reviewed. If the most recent version in the history is a committed value (i.e. not a WI), and the committed timestamp is greater than or equal to the write timestamp (commit.TS>=write.TS), then the incoming write is aborted as it is attempting to modify a committed history.

To resolve the conflict of a write transaction encountering a WI (W→W) a PUSH operation is performed, similar to the discussion above. A transaction starts when a client 160 requests a timestamp from the timestamp service 120. Each of the operations (read/write) of the transaction will be marked with the timestamp generated by the timestamp service 120. In one embodiment, any conflict detection and resolution will also use the timestamp generated by the timestamp service 120. In another embodiment, committed records will also be marked with the timestamp as a new version.

In the client application process 700, an application 202 and client 204 (including a client library) perform a write operation (write(key,Value)), where the client adds the SV, MTR and TRH to the write operation. When the write request reaches the participant 110, the most recently committed key/value is found from a partition on the participant 110. If the incoming write is older than the committed value, the incoming write transaction is immediately aborted. If an existing WI is found for the same key, a PUSH operation is called to determine if the write operation can continue, as well as which version of the data to write.

The PUSH operation (PUSH(ChallengerMTR,IncumbentMTR) will first determine the status of transaction through the participant's TRH 702 of which the current (incumbent) WI belongs. If the status is already committed or aborted, the WI (async) finalization has not been completed and can either commit the existing WI or abort the existing WI. If this situation is encountered, then the state of the incumbent WI is updated to be committed value, or in case of abort, the WI is removed from the history. The process is then re-run to determine the outcome for the Challenger write. In general terms, if the incumbent transaction is pending, then one of the two transactions will be aborted immediately to resolve the conflict. In one embodiment, determining which transaction to abort includes a comparison at least one of a of transaction priority, cost, etc. In one further embodiment, compensation logic may be used to increase any future success probability of an aborted transaction.

In one embodiment, when a PUSH operation is performed, there may be no record stored at the TRH 702 (e.g., due to a network message delay)) for the incumbent. In this case, the system assumes that the incumbent transaction has been aborted, and a status entry is set to be equal to "Aborted," making the challenger transaction the winner of the PUSH operation.

Example PUSH Operations

The depicted embodiment shows four cases of a PUSH operation for a write conflict. In case 1, the participant 110 can determine the status of the transaction (TXN). In this scenario, the transaction has already been committed (i.e., the transaction has already been transmitted). The participant 110 may commit the existing create a new WI for the new write operation from the challenger transaction and transmit a response to the client 204 and application 202.

In case 2, when the participant 110 calls a PUSH operation, the status of the W is determined to be aborted. The participant 110 aborts the existing W and creates a new WI for a new write. The WI is removed from the data cache, and the participant 110 transmits a response to the client 204 and application 202 as if the WI never existed (i.e., the version committed before WI).

In the example of cases 3.1 and 3.2, a transaction is occurring and still being modified (in progress). Thus, there is no reliable way in which to write the key/value for the transaction. In this instance, either one of the write transactions (incumbent or challenger write) operations should be aborted. That is, one of the conflicting operations may proceed and the other may be aborted in order to resolve the conflict. In case 3.1, the incumbent write operation is aborted, a new write operation is created in the participant 110. In case 3.2, the challenger write operation is aborted and a response is returned accordingly. If the status of the incumbent is changed, the incumbent transaction state is recorded in the TRH 702.

Figure 7:
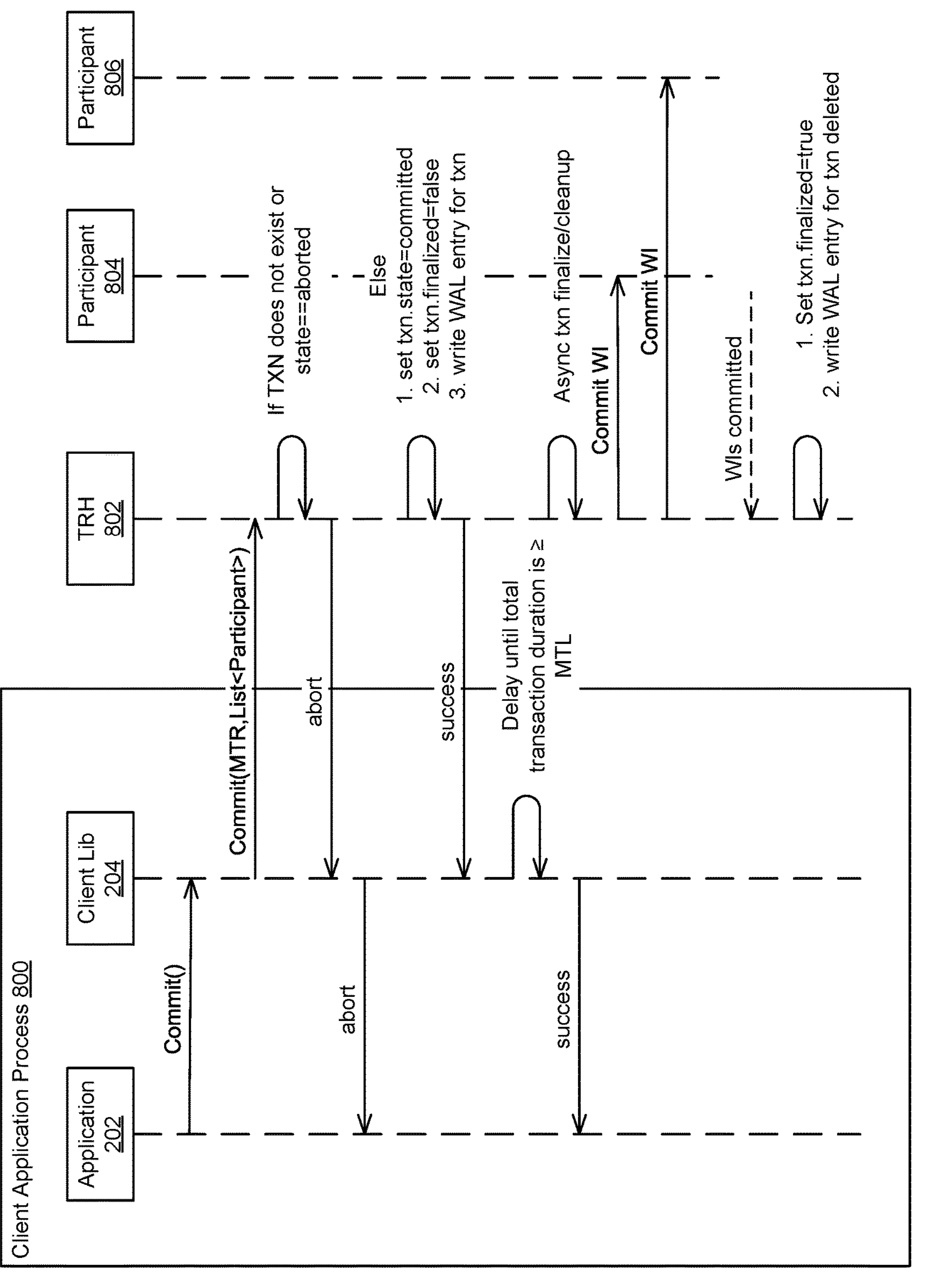
FIG. 7 illustrates an example of a commit operation in accordance with the disclosure.

FIG. 7 illustrates an example of a commit operation in accordance with the disclosure. In the depicted example, the application 202 and client 204 (including the client library) send a commit operation (Commit( )) to the TRH, where the client 204 adds the MTR and list of participants (LIST<participant>), such as TRH (participant) 802, 804 and 806, to the commit operation. When the TRH receives the commit message, a determines the current transaction state. If the transaction state is determined to be aborted or not exist, then a message is returned to the client 204/application 202 as an "abort." Otherwise, the transaction state is set to commit (but not finalized) and a WAL entry is written for the transaction. A response message of "success" is then returned to the client 204/application 202.

In one embodiment, when a client 204 is done executing the operations of a transaction and is processing the transaction commit, the client 204 checks that the total transaction duration is greater than or equal to the MTL in order to guarantee external causal relationships are recorded correctly in the system 100 for all applications 202. If the client 204 determines that insufficient time has elapsed, the client 204 may delay the delivery of the commit transmission result to the application 202 until the total transaction duration is equal to or greater than the MTL.

Once the application 202 has successfully performed all of its operations, the TRH 802 finalizes (i.e., commits) the transaction. In one embodiment, the state of the transaction at the TRH 802 is "Aborted." Within the context of process 800, an abort is performed similar to a commit—a message is sent to the TRH 802 and the state of the transaction is set to "Aborted." The TRH 802 then performs an asynchronous cleanup of WIs (if any) at the transaction participants 804 and 806. The asynchronous cleanup is driven by the TRH 802 to handle the transaction state in the system 100 after the transaction is committed/aborted. This process involves communicating with all transaction write participants (e.g., participants 804 and 806) in order to commit/abort the WIs present in the respective participants. For an aborted transaction as a result of a PUSH operation, the TRH 802 state is marked as "aborted" and the finalization process is initiated when the client attempts to commit/abort.

In one embodiment, when a client abandons a transaction, the TRH 802 will self-mark the transaction as aborted. Each participant 804 and 806 will then independently discover any WIs which are too old (after a timeout period has been surpassed), and the TRH is contacted to ensure the transaction is active. The TRH 802 will then discover that the transaction has been aborted due to expiration of the timeout period and will cleanup respective WIs.

In one further embodiment, applications may be allowed to execute operations in batches such that operations are grouped in the same participant into a single message. In this manner, the WI may be placed at any point in the history as long as there is no conflict with the read cache. In this embodiment, a separate WAL may be used for WIs. Still further, in one embodiment, a watermark can be maintained and the tail dropped past the watermark once WIs are finalized. Atomic higher-level operations may be provided, such as swap, compare_and_swap, atomic_read_many, acquire_lease, acquire_lease_many, update_if_lease_held. Moreover, better throughput may be achieved under a standard benchmark if, a HOLD in cases of conflict, a resolution (PUSH operation) is allowed, A Challenger, which will succeed if the outcome of an intent is known, and can be held onto the candidate operation for a short period of time to allow for the WI to commit. Alternatively, a solution which does a transparent hold may be implemented—a hold that does not require special handling at the client (e.g., additional notification and heart-beating). This could be achieved by re-queueing an incoming task once with a delay of potential network round-trip latency (e.g. 10-20 μs).

Figure 8:
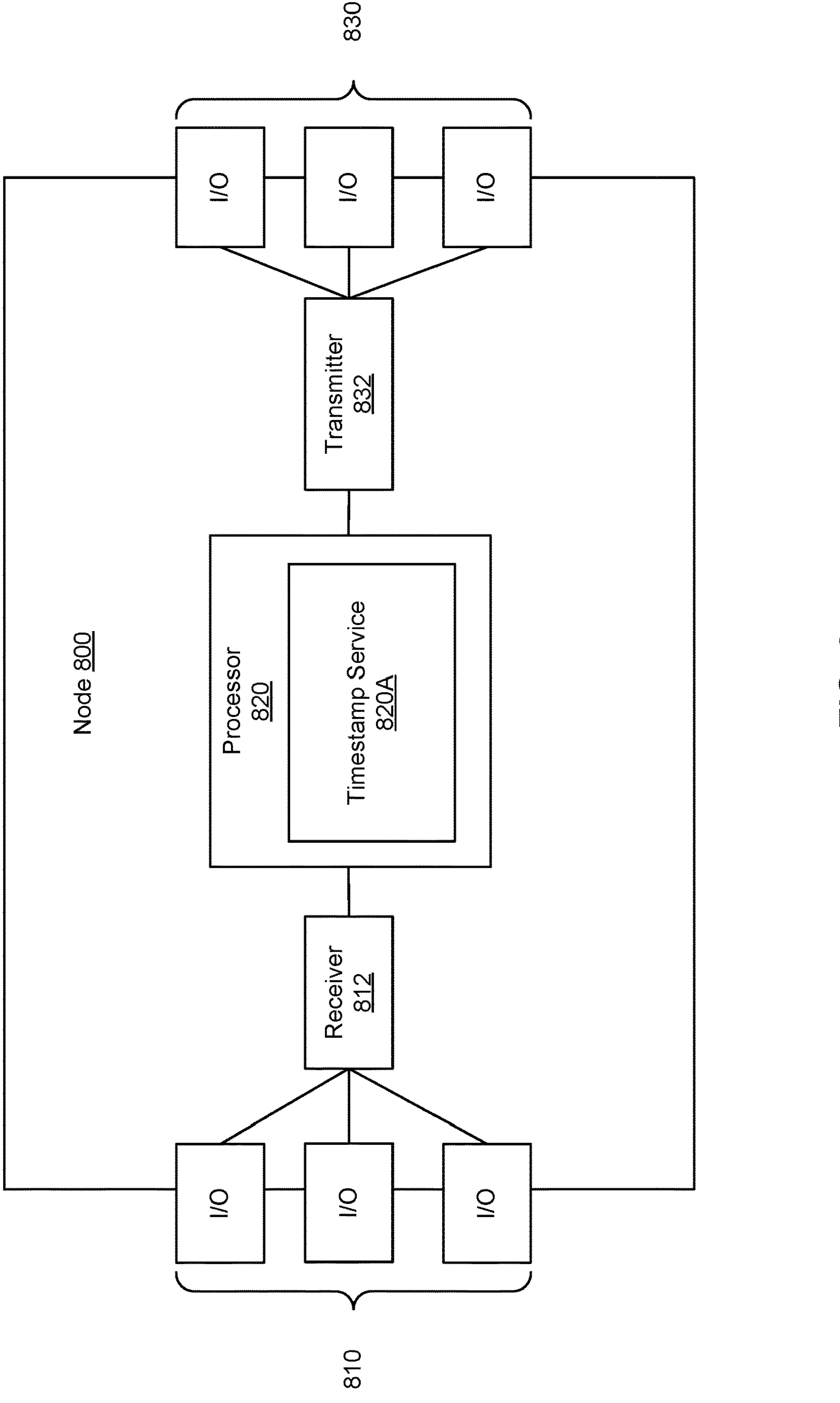
FIG. 8 illustrates an embodiment of a node in accordance with embodiments of the disclosure.

FIG. 8 illustrates an embodiment of a node in accordance with embodiments of the disclosure. The node (e.g., a server, router, etc.) 900 may be, for example, any of the computing devices 110 and 160 in the system of FIG. 1 or any other node as described above. The node 900 may comprise a plurality of input/output ports 910/930 and/or receivers (Rx) 912 and transmitters (Tx) 932 for receiving and transmitting data from other nodes, a processor 920, including a timestamp service 120 to timestamp operations.

Although illustrated as a single processor, the processor 920 is not so limited and may comprise multiple processors. The processor 920 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 920 may be configured to implement any of the schemes described herein using any one or combination of steps described in the embodiments. Moreover, the processor 920 may be implemented using hardware, software, or both.

Figure 9:
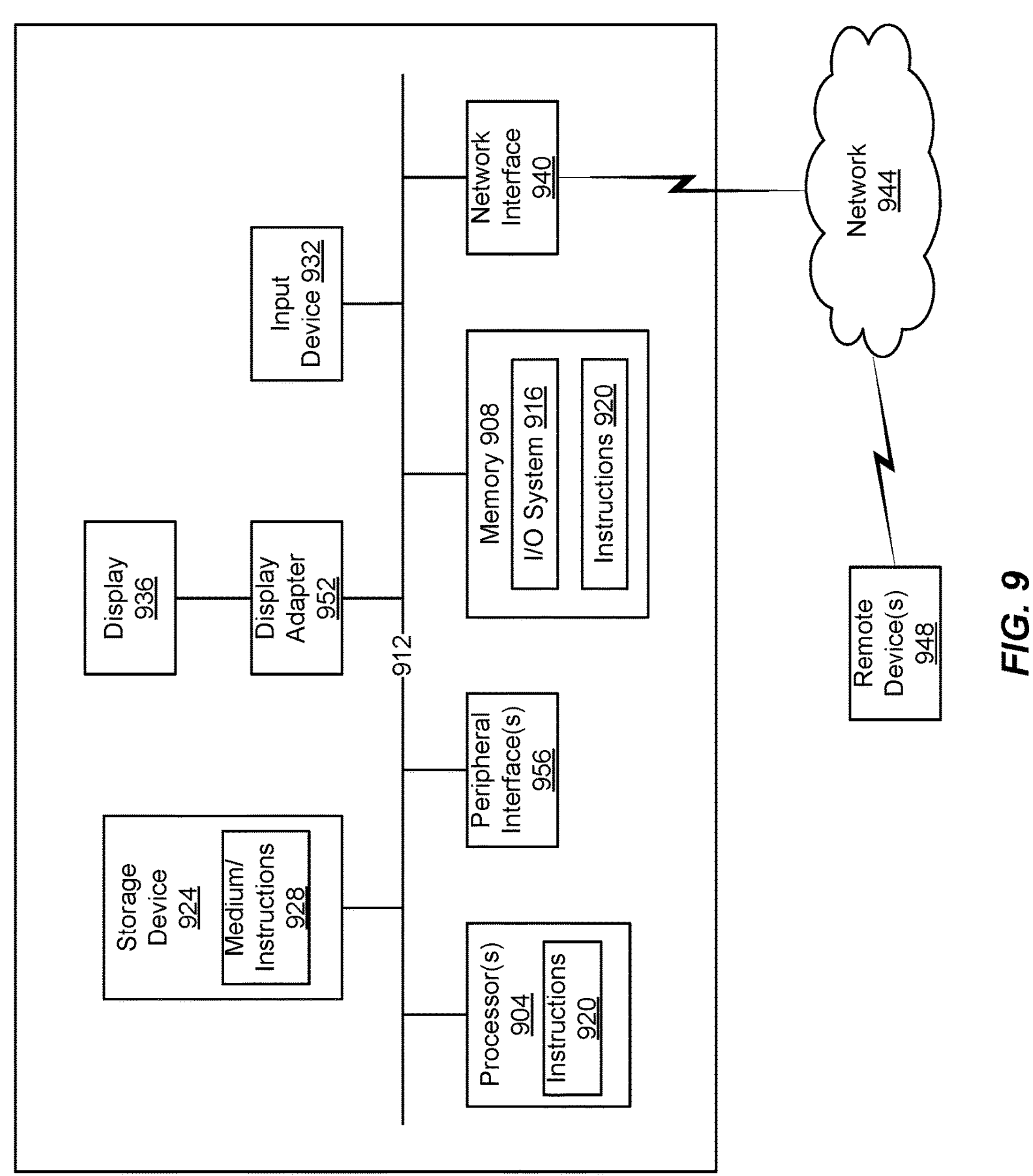
FIG. 9 shows an example embodiment of a computing system for implementing embodiments of the disclosure.

FIG. 9 shows an example embodiment of a computing system for implementing embodiments of the disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine-readable media) including, but not limited to, a random access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing a sequence of transactions to maintain consistency and latency in a distributed system, comprising:

receiving, by a node, a first transaction for a data record associated with a first timestamp generated by a timestamp service;

identifying, by the node, a second transaction for the data record that conflicts with the first transaction, wherein the identified second transaction has a second timestamp that is a most recent transaction stored in the node; and receiving a determination, by the node, of a transmission status of the second transaction;

transmitting, by the node, a result of the first transaction to fulfill the first transaction received from a client based on the determination of the transmission status, fulfillment of the first transaction occurring after a full transmission time period of the first transaction is greater than or equal to a minimum transaction latency (MTL) of the distributed system; and wherein a maximum error of a standard clock synchronization mechanism, namely the standard clock synchronization error at each timestamp service, in the distributed system is less than a minimum transaction latency (MTL).

2. The computer-implemented method of claim 1, wherein the first and second timestamps include an uncertainty window, and the uncertainty window is based on the standard clock synchronization error at the timestamp service issuing the first or second timestamp.

3. The computer-implemented method of claim 1, wherein the first timestamp includes a first sequence number and a first uncertainty window, and the second timestamp includes a second sequence number and a second uncertainty window.

4. The computer-implemented method of claim 3, wherein the first and second timestamps are issued by different timestamp service instances, and when the sequence numbers are tied, the tie is broken by a timestamp service instance ID.

5. The computer-implemented method of claim 1 further comprising sequentially ordering the first transaction and the second transaction according to a first sequence number and a second sequence number, respectively, wherein the first and second timestamps are issued by a first timestamp service.

6. The computer-implemented method of claim 5, wherein the first and second timestamps are issued by different timestamp service instances, and when the sequence numbers are tied, the tie is broken by a timestamp service instance ID.

7. The computer-implemented method of claim 1, wherein when the first transaction is a read operation and the second transaction is a write intent operation, the transmission status of the second transaction is determined to be committed, and the result transmitted to the client is the data record for write intent operation; and when the first transaction is a write operation and the second transaction is a write intent operation, the transmission status of the second transaction is determined to be committed, and the result transmitted to the client is a success message.

8. The computer-implemented method of claim 1, wherein when the first transaction is a read operation and the second transaction is a write intent operation, the transmission status of the second transaction is determined to be aborted, and the result transmitted to the client is the data record committed before the write intent operation; and when the first transaction is a write operation and the second transaction is a write intent operation, the transmission status of the second transaction is determined to be aborted, and the result transmitted to the client is a success message.

9. The computer-implemented method of claim 1, wherein the first transaction is a read operation and the second transaction is a write intent operation, the transmission status of the second transaction is determined to be in-progress, and the method further comprising:

aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

10. The computer-implemented method of claim 9, wherein when the second transaction is aborted, marking the second transaction as aborted and issuing an asynchronous transmission cleanup, and the result transmitted to the client is the data record committed before the write intent operation; and when the first transaction is aborted, the result transmitted is a failure on the read operation.

11. The computer-implemented method of claim 9, wherein when the first and the second transactions are a same transaction, the write intent is returned in response to the read operation.

12. The computer-implemented method of claim 1, wherein the first transaction is a write operation and the second transaction is a write intent operation, the transmission status of the second transaction is determined to be in-progress, and the method further comprising:

aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

13. The computer-implemented method of claim 12, wherein when the second transaction is aborted, marking the second transaction as aborted and issuing an asynchronous transmission cleanup, and the result transmitted to the client is a success message; and when the first transaction is aborted, the result transmitted is a failure message.

14. A node for processing a sequence of transactions to maintain consistency and latency in a distributed system, comprising:

a non-transitory memory storage comprising instructions; and one or more processors in communication with the memory, wherein the one or more processors execute the instructions to:

generate time stamps including a first timestamp;

receive a first transaction for a data record associated with the first timestamp;

identify a second transaction for the data record that conflicts with the first transaction, wherein the identified second transaction has a second timestamp that is a most recent transaction stored in the node;

receive a determination of a transmission status of the second transaction; and transmitting a result of the first transaction to fulfill the first transaction received from a client based on the determination of the transmission status, fulfillment of the first transaction occurring after a full transmission time period of the first transaction is greater than or equal to a minimum transaction latency (MTL) of the distributed system; and wherein a maximum error of a standard clock synchronization mechanism, namely the standard clock synchronization error at each timestamp service, in the distributed system is less than a minimum transaction latency (MTL).

15. The node of claim 14, wherein the first and second timestamps include an uncertainty window, and the uncertainty window is based on the standard clock synchronization error at the timestamp service issuing the first or second timestamp.

16. The node of claim 14, wherein the first timestamp includes a first sequence number and a first uncertainty window, and the second timestamp includes a second sequence number and a second uncertainty window.

17. The node of claim 16, further comprising sequentially ordering the first transaction and the second transaction according to the first sequence number and the second sequence number, respectively, wherein the first and second timestamps are issued by a first timestamp service.

18. The node of claim 14, wherein when the first transaction is a read operation and the second transaction is a write intent operation, the transmission status of the second transaction is determined to be committed, and the result transmitted to the client is the data record for write intent operation; and when the first transaction is a write operation and the second transaction is a write intent operation, the transmission status of the second transaction is determined to be committed, and the result transmitted to the client is a success message.

19. The node of claim 14, wherein when the first transaction is a read operation and the second transaction is a write intent operation, the transmission status of the second transaction is determined to be aborted, and the result transmitted to the client is the data record committed before the write intent operation; and when the first transaction is a write operation and the second transaction is a write intent operation, the transmission status of the second transaction is determined to be aborted, and the result transmitted to the client is a success message.

20. The node of claim 14, wherein the first transaction is a read operation and the second transaction is a write intent operation, the transmission status of the second transaction is determined to be in-progress, and the one or more processors further execute the instructions to:

aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

21. The node of claim 20, wherein when the second transaction is aborted, marking the second transaction as aborted and issuing an asynchronous transmission cleanup, and the result transmitted to the client is the data record committed before the write intent operation; and when the first transaction is aborted, the result transmitted is a failure on the read operation.

22. The node of claim 20, wherein when the first and the second transactions are a same transaction, the write intent is returned in response to the read operation.

23. The node of claim 20, wherein the first transaction is a write operation and the second transaction is a write intent operation, the transmission status of the second transaction is determined to be in-progress, and the one or more processors further execute the instructions to:

aborting one of the first transaction or the second transaction based on a lowest priority of respectively assigned priorities; and when the priorities of the first transaction and the second transaction are the same, aborting one of the first transaction and the second transaction based on an oldest of the first timestamp and the second timestamp.

24. The node of claim 23, wherein when the second transaction is aborted, marking the second transaction as aborted and issuing an asynchronous transmission cleanup, and the result transmitted to the client is a success message; and when the first transaction is aborted, the result transmitted is a failure message.

* * * * *